(12) United States Patent
Preissner et al.

(10) Patent No.: US 10,393,242 B2
(45) Date of Patent: Aug. 27, 2019

(54) METHOD AND APPARATUS FOR IMPLEMENTING ULTRA-HIGH STABILITY LONG-VERTICAL TRAVEL STAGE

(71) Applicant: UChicago Argonne, LLC, Chicago, IL (US)

(72) Inventors: Curt A. Preissner, Chicago, IL (US); David Vine, Chicago, IL (US); Chris J. Jacobsen, Naperville, IL (US); Jorg M. Maser, Oak Park, IL (US); Barry Lai, Woodridge, IL (US); Christian Roehrig, Plainfield, IL (US); Oliver A. Schmidt, Lombard, IL (US); Franz Stefan Vogt, Plainfield, IL (US)

(73) Assignee: UChicago Argonne, LLC, Chicago, IL (US)

( * ) Notice: Subject to any disclaimer, the term of this patent is extended or adjusted under 35 U.S.C. 154(b) by 304 days.

(21) Appl. No.: 15/253,092

(22) Filed: Aug. 31, 2016

(65) Prior Publication Data

US 2018/0058552 A1 Mar. 1, 2018

(51) Int. Cl.
*F16H 25/18* (2006.01)
*B23Q 1/01* (2006.01)
*B23Q 1/25* (2006.01)
*F16C 29/00* (2006.01)

(52) U.S. Cl.
CPC .......... *F16H 25/183* (2013.01); *B23Q 1/015* (2013.01); *B23Q 1/25* (2013.01); *F16C 29/005* (2013.01)

(58) Field of Classification Search
CPC .......... B23Q 1/01; B23Q 1/015; B23Q 1/262; B23Q 1/26; B23Q 1/28; F16C 29/008; F16C 29/12; F16C 29/04
See application file for complete search history.

(56) References Cited

U.S. PATENT DOCUMENTS

| 1,485,016 | A | * | 2/1924 | Cardullo | B23Q 1/262 384/39 |
| 2,248,715 | A | * | 7/1941 | Mafera | F16M 7/00 254/104 |
| 4,155,173 | A | * | 5/1979 | Sprandel | G01B 5/008 33/1 M |
| 4,392,642 | A | * | 7/1983 | Chitayat | B23Q 1/385 250/442.11 |
| 4,571,799 | A | * | 2/1986 | Chitayat | B23Q 1/385 108/137 |
| 4,838,515 | A | * | 6/1989 | Prentice | B23Q 1/48 248/419 |
| 5,731,641 | A | * | 3/1998 | Botos | G03F 7/70716 108/138 |
| 6,486,574 | B2 | * | 11/2002 | Botos | G05D 3/12 108/138 |

(Continued)

*Primary Examiner* — Tyrone V Hall, Jr.
(74) *Attorney, Agent, or Firm* — Joan Pennington

(57) ABSTRACT

A method and apparatus for implementing an ultra-high stability long-vertical travel stage are provided. The ultra-high stability long-vertical travel stage includes a first wedge supporting a second wedge, each wedge formed of a selected stable material having predefined rigidity and low thermal expansion coefficient, and integrated air bearings. A linear guiding mechanism includes a plurality of flexures. The first wedge is driven in a plane providing vertical motion on the second wedge with the integrated air bearings lifted and the flexures allowing for movement.

13 Claims, 18 Drawing Sheets

(56) References Cited

U.S. PATENT DOCUMENTS

| | | | |
|---|---|---|---|
| 6,591,757 B1 * | 7/2003 | Rajaraman | B23Q 5/28 104/290 |
| 9,877,576 B2 * | 1/2018 | Satou | A47B 9/10 |
| 2015/0160564 A1 | 6/2015 | Balan | |

* cited by examiner

500

$F_W = mg$
$F_S = F_W * \cos \alpha = mg * \cos \alpha$
$F_N = F_W * \sin \alpha = mg * \sin \alpha$

METHOD AND APPARATUS FOR IMPLEMENTING ULTRA-HIGH STABILITY LONG-VERTICAL TRAVEL STAGE

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

The present invention relates generally to precision positioning stage systems, and more particularly, relates to a method and apparatus for implementing an ultra-high stability long-vertical travel stage.

DESCRIPTION OF THE RELATED ART

Currently highly stable vertical translation stages with many millimeters of travel are not available commercially. The most stable vertical stages have a wedge design. In the wedge-type stage, vertical motion is generated through the relative lateral motion of two horizontally traveling wedges.

The best available wedge-type stages use rolling elements to guide the motion of the wedges. This type of design has two shortcomings: I) rolling element bearings are limited in stiffness, and 2) rolling element bearings are made from steel, which has a large thermal expansion coefficient. Both of these shortcomings limit the performance of wedge-style vertical stages in applications that require ultra-high stability, such as X-ray microscopy and semiconductor processing. The limited stiffness of the rolling-element guides makes the structure more susceptible to vibration. The thermal expansion of the steel bearings limits the long-term stability.

It is desirable to provide an enhanced ultra-high stability long-vertical travel stage.

It is desirable to provide such ultra-high stability long-vertical travel stage enabling an arbitrary travel range with dynamic and thermal stability, for example, a travel range of a few millimeters to 100 mm or more.

It is desirable to provide such enhanced ultra-high stability long-vertical travel stage enabling multiple axes of motion that are more rigid and more thermally stable than conventional arrangements.

SUMMARY OF THE INVENTION

Principal aspects of the present invention are to provide a method and apparatus for implementing an ultra-high stability long-vertical travel stage. Other important aspects of the present invention are to provide such method and apparatus substantially without negative effect and that overcome some of the disadvantages of prior art arrangements.

In brief, a method and apparatus for implementing an ultra-high stability long-vertical travel stage are provided. The travel stage includes a first wedge supporting a second wedge, each wedge formed of a selected stable material having predefined rigidity and low thermal expansion coefficient, and integrated air bearings. A drive and linear guiding assembly includes a plurality of flexures. The first wedge is driven along a path such that an increase in cross section provides a vertical motion on the second wedge with the integrated air bearings lifted and the flexures allowing for movement.

In accordance with features of the invention, each wedge is formed of a selected stable material, such as, granite, a low thermal expansion glass, or a nickel-iron alloy.

In accordance with features of the invention, the air bearings are designed for wedge-to-wedge contact or granite-to-granite contact when the travel stage is not in motion. This yields the rigidity of a solid piece of granite.

In accordance with features of the invention, a low angle of the travel stage wedge insures that the two wedges are fixed in place due to the action of friction alone.

In accordance with features of the invention, a vertical travel range is enabled in a selected range, such as between about 10 millimeters and 100 millimeters.

In accordance with features of the invention, the enhanced ultra-high stability long-vertical travel stage enables multiple axes of motion that are more rigid and more thermally stable than conventional arrangements.

In accordance with features of the invention, the thermal expansion of rolling element bearings is eliminated through the granite-to-granite contact.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
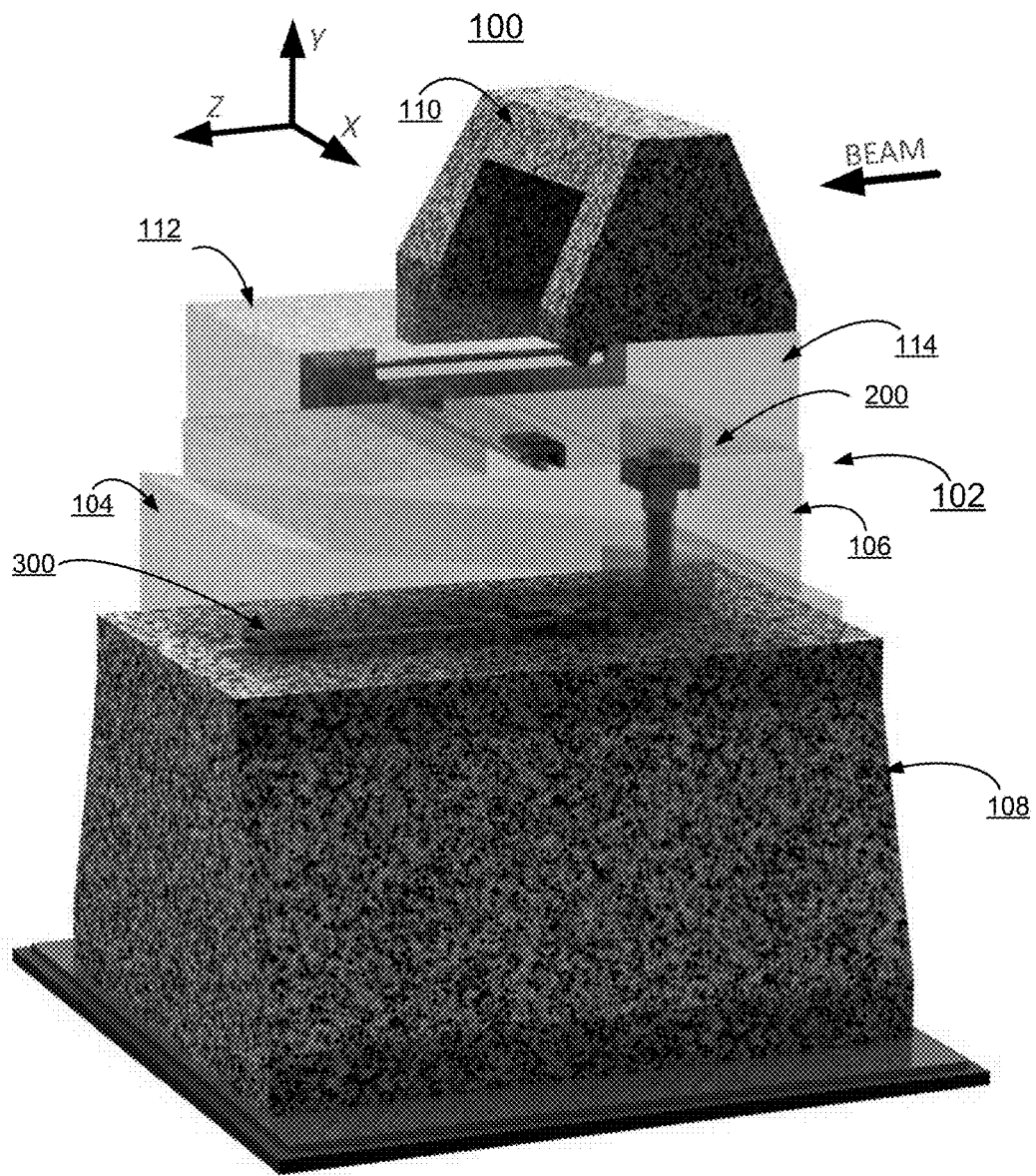
FIGS. 1, 2, 3, 4, 5, 6, 7, 8, 9, and 10 schematically illustrate not to scale an example apparatus for implementing an ultra-high stability long-vertical travel stage in accordance with a preferred embodiment.

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus for implementing an ultra-high stability long-vertical travel stage are provided. The ultra-high stability long-vertical travel stage includes a first wedge supporting a second wedge, each wedge formed of a selected stable material having predefined rigidity and low thermal expansion coefficient, and integrated air bearings. A drive and linear guiding assembly includes a plurality of flexures. The first wedge is driven along a path such that an increase in cross section provides vertical motion on the second wedge with the integrated air bearings lifted and the flexures allowing for movement.

Having reference now to the drawings, in FIGS. 1, 2, 3, 4, 5, 6, 7, 8, 9, and 10, there is schematically shown example apparatus generally designated by the reference character 100 for implementing an ultra-high stability long-vertical travel stage generally designated by the reference character 102 in accordance with a preferred embodiment. The ultra-high stability long-vertical travel stage 102 provides a novel assembly for achieving long-travel vertical motion with ultra-high stability, for example, at a nano-meter (nm) level. Apparatus 100 meets the needs of synchrotron radiation instrumentation and other applications where a long-travel, highly stable platform is required. The ultra-high stability long-vertical travel stage 102 includes wedge geometry used to provide vertical motion. The ultra-high stability long-vertical travel stage 102 combines a multi-wedge stage and air bearings, and is selectively sized for enabling an arbitrarily long travel capability. The ultra-high stability long-vertical travel stage 102 is arranged to be inherently stable.

In accordance with features of the invention, the ultra-high stability long-vertical travel stage 102 is designed to be inherently stable and has, for example, a travel 25 mm, 25 mm, 400 mm (XYZ), mass of 2800 kg (6169 lb), and air bearing lift: approximately 5 μm (micro-meter). An arbitrary travel range can be provided by the enhanced ultra-high stability long-vertical travel stage 102 (depending on available space) with dynamic and thermal stability typically associated with a rigid structure. The ultra-high stability long-vertical travel stage 102 is designed, for example, to provide coarse motion to place optic in beam.

Referring now to FIG. 1, the apparatus 100 includes a base member 108 supporting the ultra-high stability long-vertical travel stage 102. The apparatus 100 includes an optics carrying stage 110 carried by a support surface 112 of planar support member 114 with an integrated air bearing and drive guide assembly 116. The planar support member 114 is carried by the ultra-high stability long-vertical travel stage 102. Base member 108 is provided by a granite base, for example, having a mass of 1628 kg, or 3582 lb.

The ultra-high stability long-vertical travel stage 102 includes a first wedge 104 supporting a second wedge 106, that are shown as transparent members 104, 106 in FIG. 1 to illustrate interior details. Each wedge 104, 106 is formed of a selected stable material, such as granite, low thermal expansion glass, and a nickel-iron alloy, such as Invar also known generically as FeNi36 (64FeNi in the US), notable for its uniquely low coefficient of thermal expansion (CTE). Each wedge 104, 106 forming the ultra-high stability long-vertical travel stage 102 includes machined surfaces to provide sufficient flatness.

Figure 11:
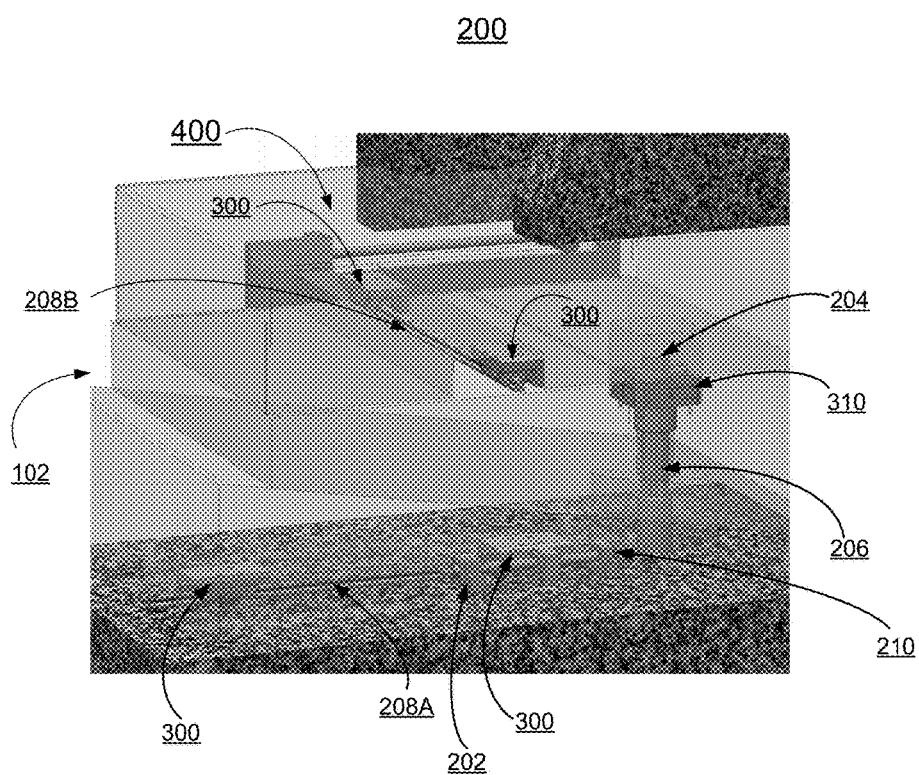
FIG. 11 schematically illustrates not to scale an example Y-axis drive assembly and linear guiding mechanisms of the apparatus of FIGS. 1-10 in accordance with preferred embodiments.
Figure 12A:
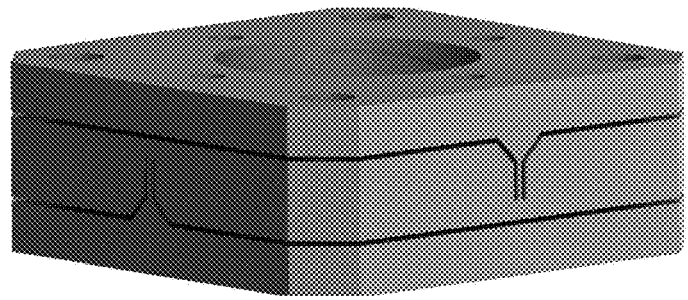
FIGS. 12A and 12B schematically illustrates not to scale a respective example two-axis rotation flexure between a ball spline and driven wedge and a single-axis translation flexure between a linear guide and a driving wedge of FIG. 11 in accordance with preferred embodiments, FIG. 13 schematically illustrates not to scale an example Z-axis drive assembly and linear guiding mechanisms of the apparatus of FIGS. 1-10 and 11 in accordance with preferred embodiments.
Figure 12B:
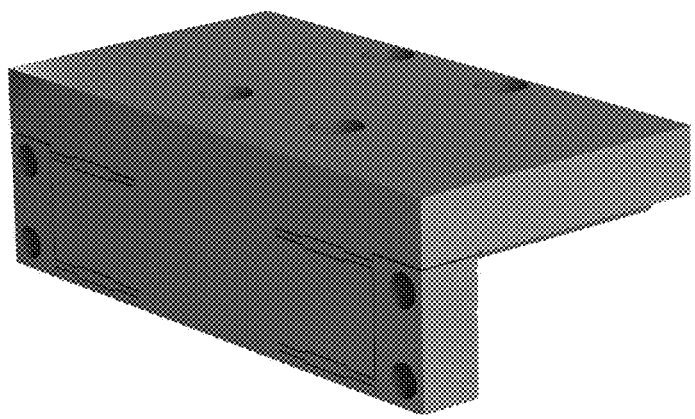
Figure 13:
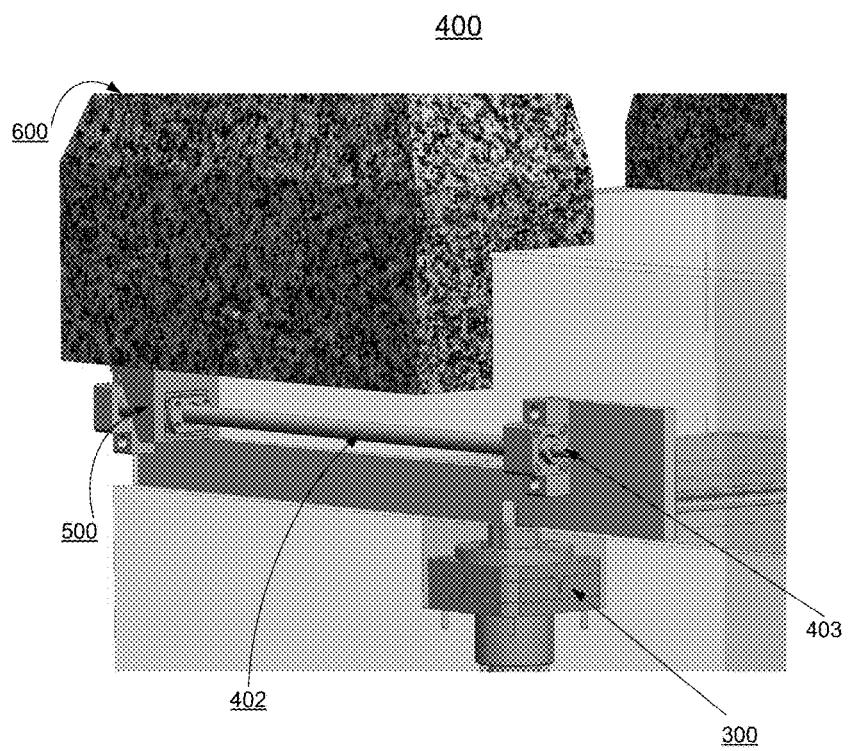
Figure 16:
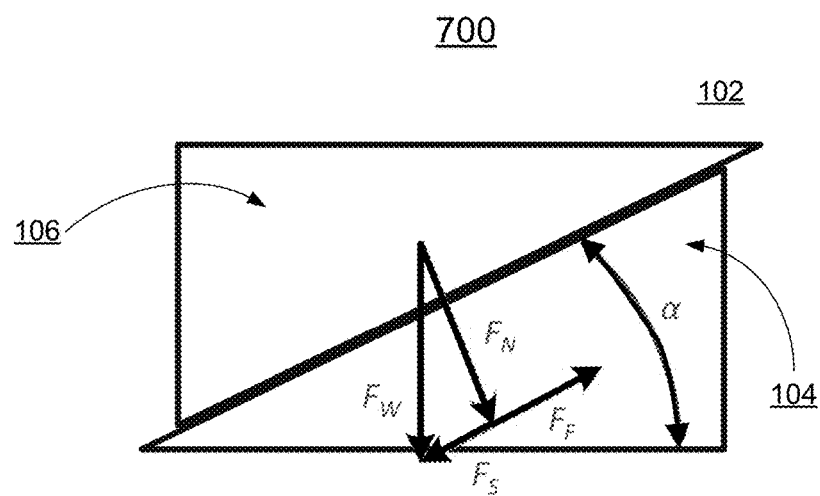
FIG. 16 schematically illustrates not to scale example forces with two wedges of an example ultra-high stability long-vertical travel stage in accordance with a preferred embodiment.
Figure 17:
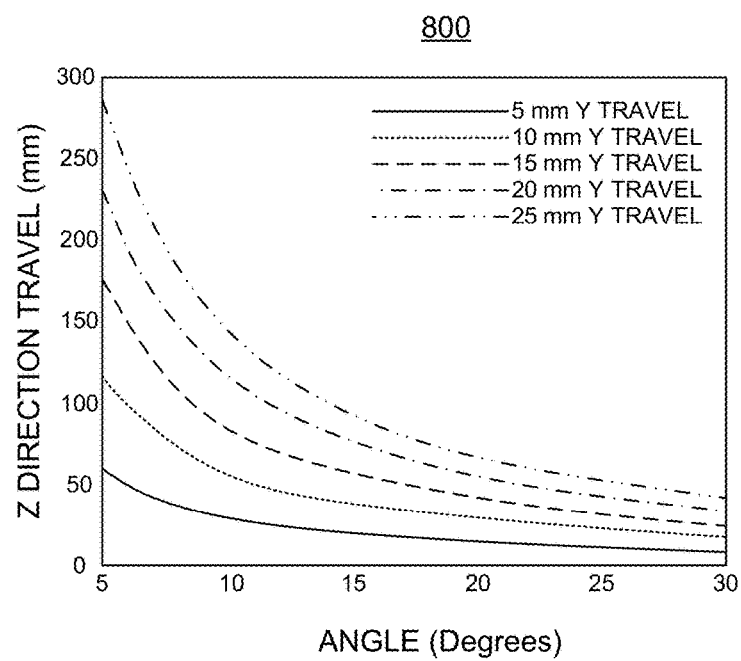
FIG. 17 illustrates not to scale example wedge angle diagram with angle in degrees shown along the horizontal axis and Z direction travel in millimeters shown with respect to the vertical axis for example Y travel range of an example ultra-high stability long-vertical travel stage in accordance with a preferred embodiment.
Figure 18:
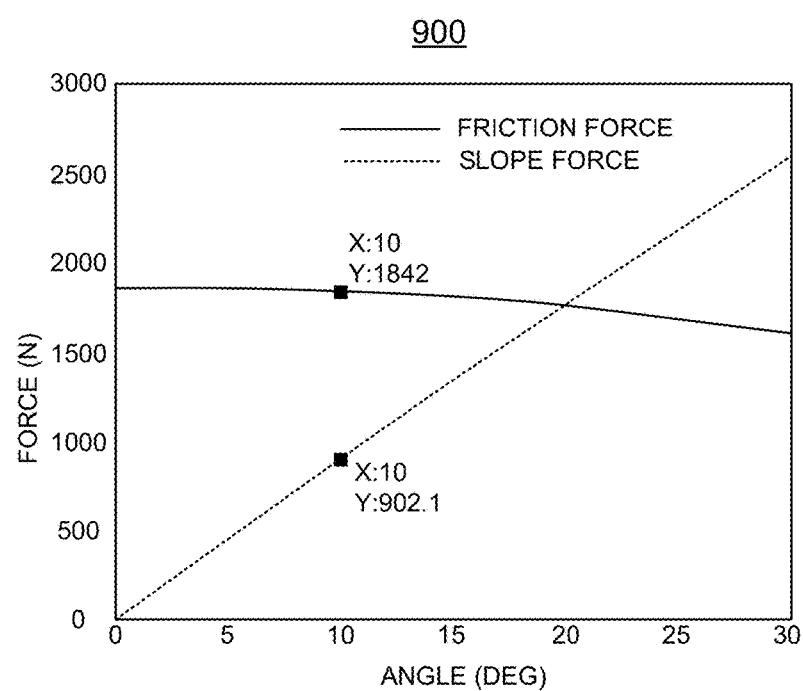
FIG. 18 illustrates not to scale example force estimation diagram with angle in degrees shown along the horizontal axis and thrust force in N shown with respect to the vertical axis for example friction force and slope force of an example ultra-high stability long-vertical travel stage in accordance with a preferred embodiment.

The first wedge 104, driven by a Z-axis drive assembly generally designated by the reference character 400, further illustrated and described with respect to FIGS. 11 and 13. X-axis and Y-axis single-axis translation flexures 300 carried by a linear guide single rail 208 of Y-axis drive and guiding assembly 200 and the driving wedge 104 and two-axis rotation flexure 310 between a ball spline 206 and the driven wedge 106 are illustrated in FIGS. 11, 12A, and 12B. Z-axis drive assembly 400 illustrated in FIG. 13 includes a Z-axis decoupling flexure 500 illustrated in FIG. 14 and a Z-axis air bearing configuration 600 illustrated in FIG. 15, for example providing an air bearing lift of approximately 5 μm (micrometers). FIGS. 16-18 illustrate example operations of the ultra-high stability long-vertical travel stage 102.

Figure 2:
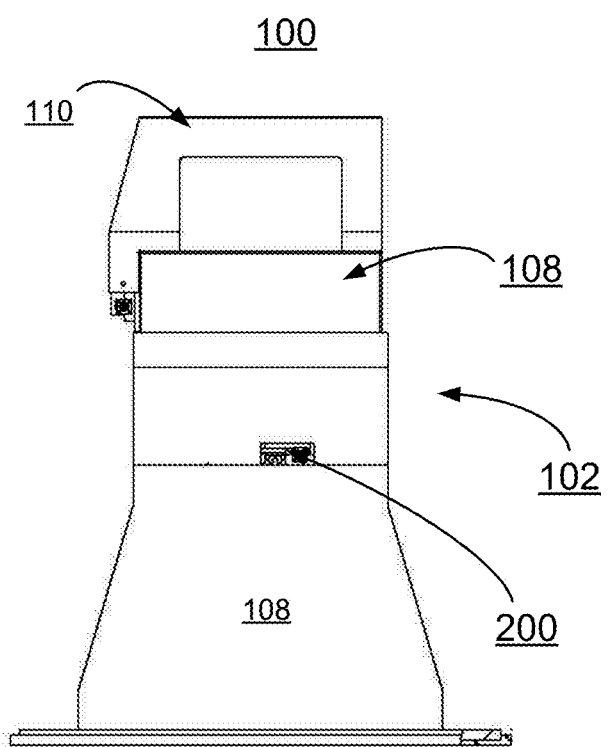
Figure 3:
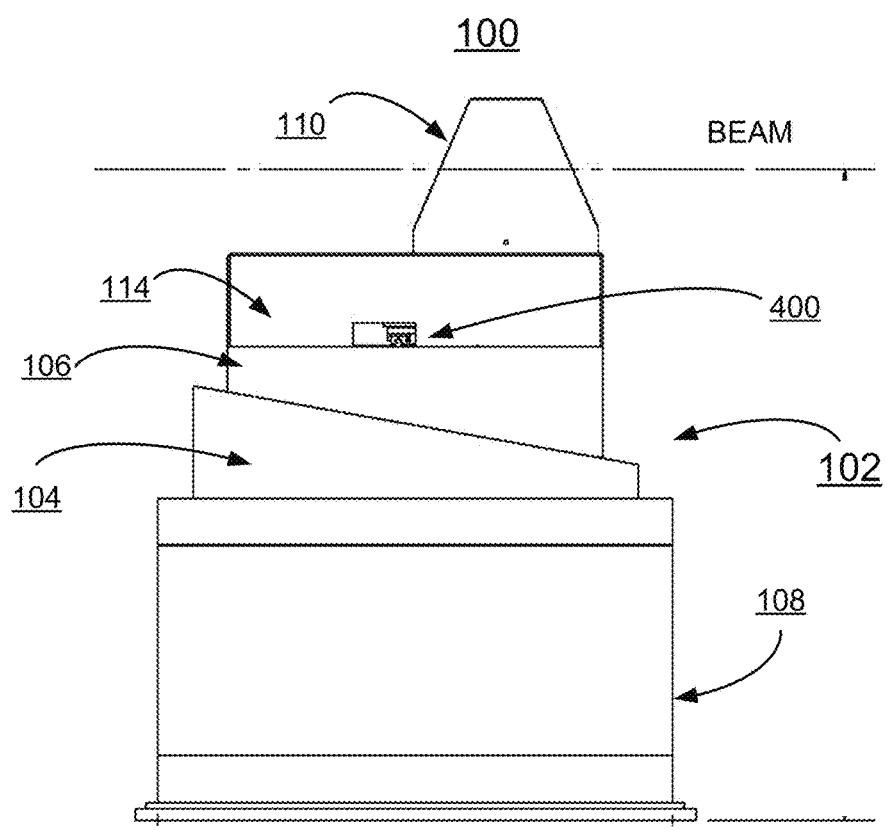
Figure 4:
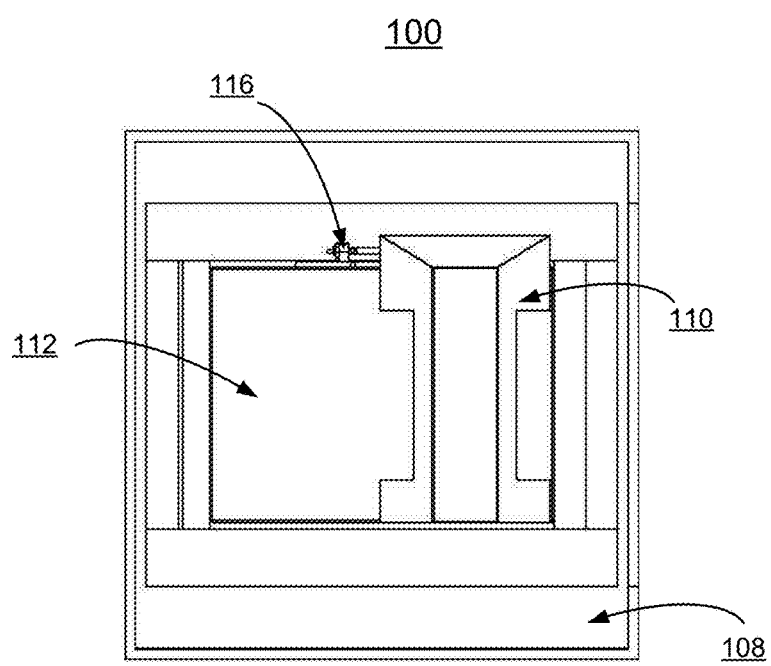
Figure 5:
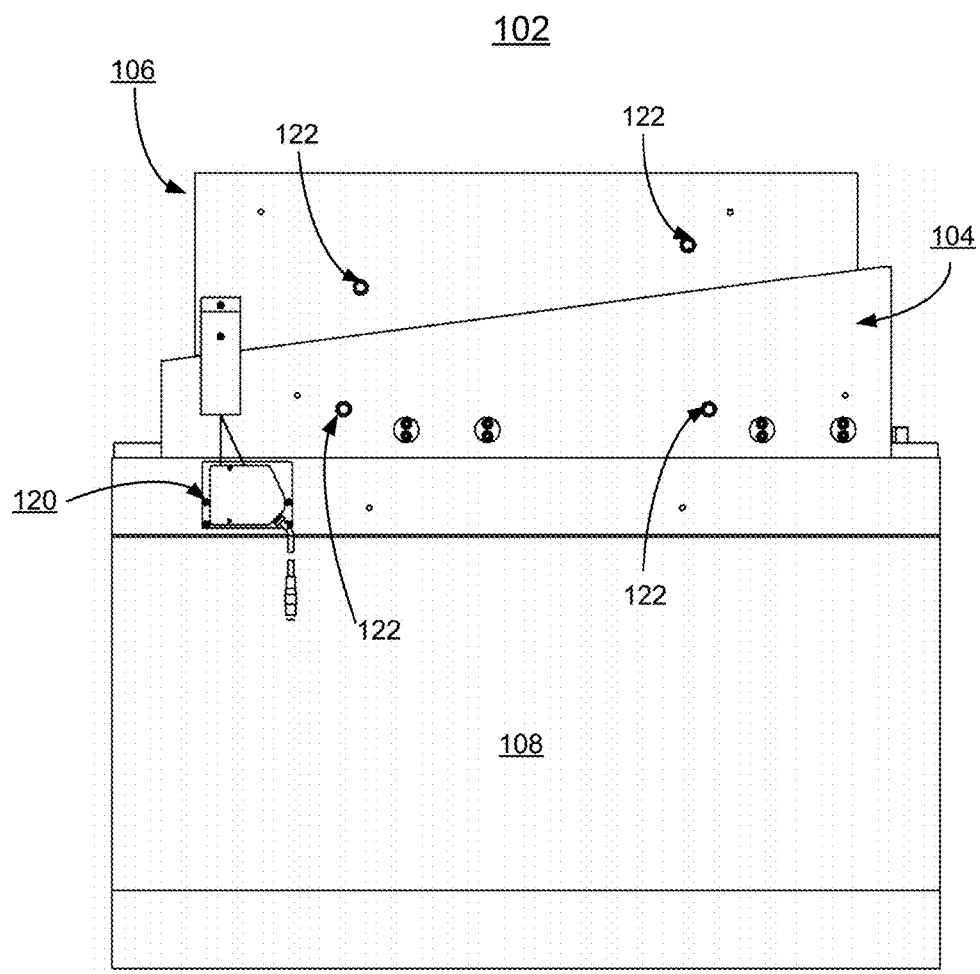
Figure 6:
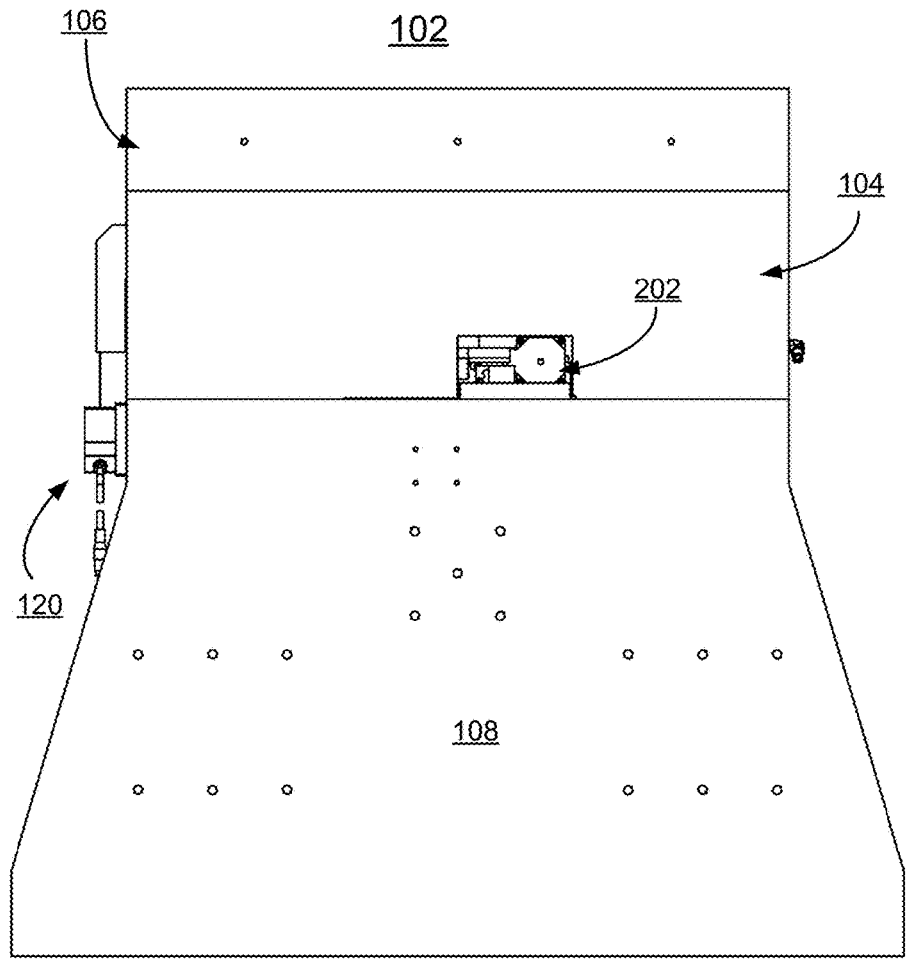
Figure 7:
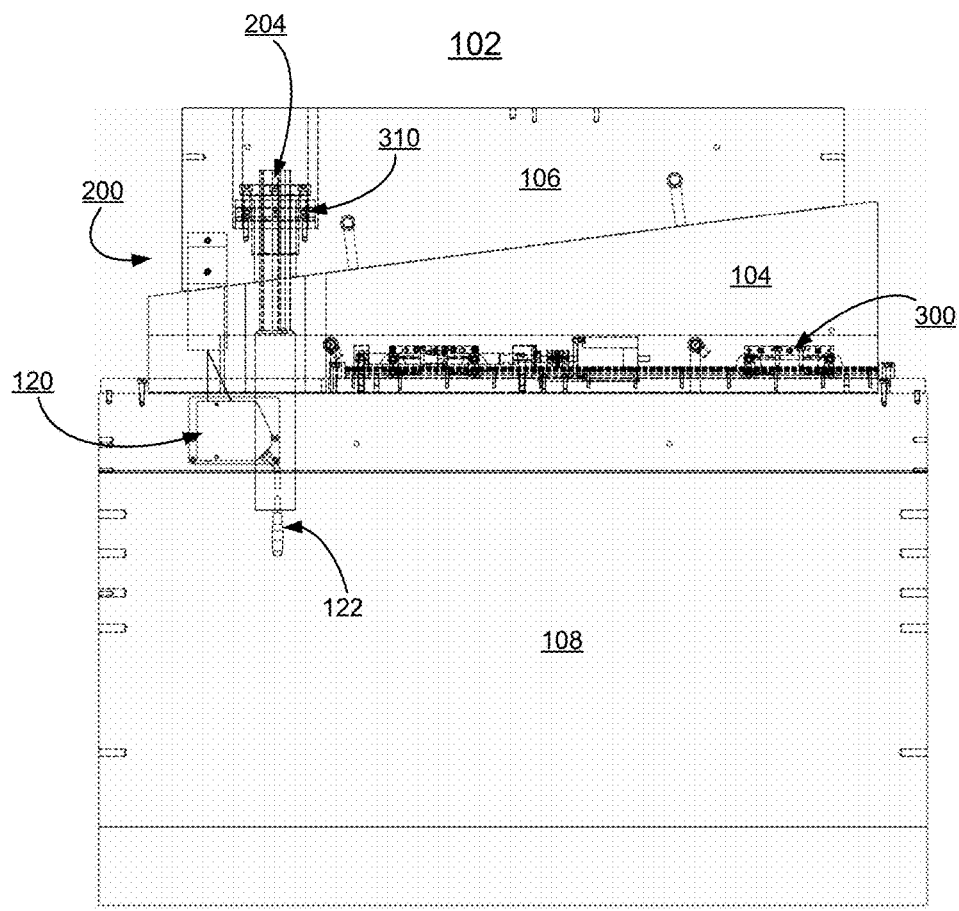
Figure 8:
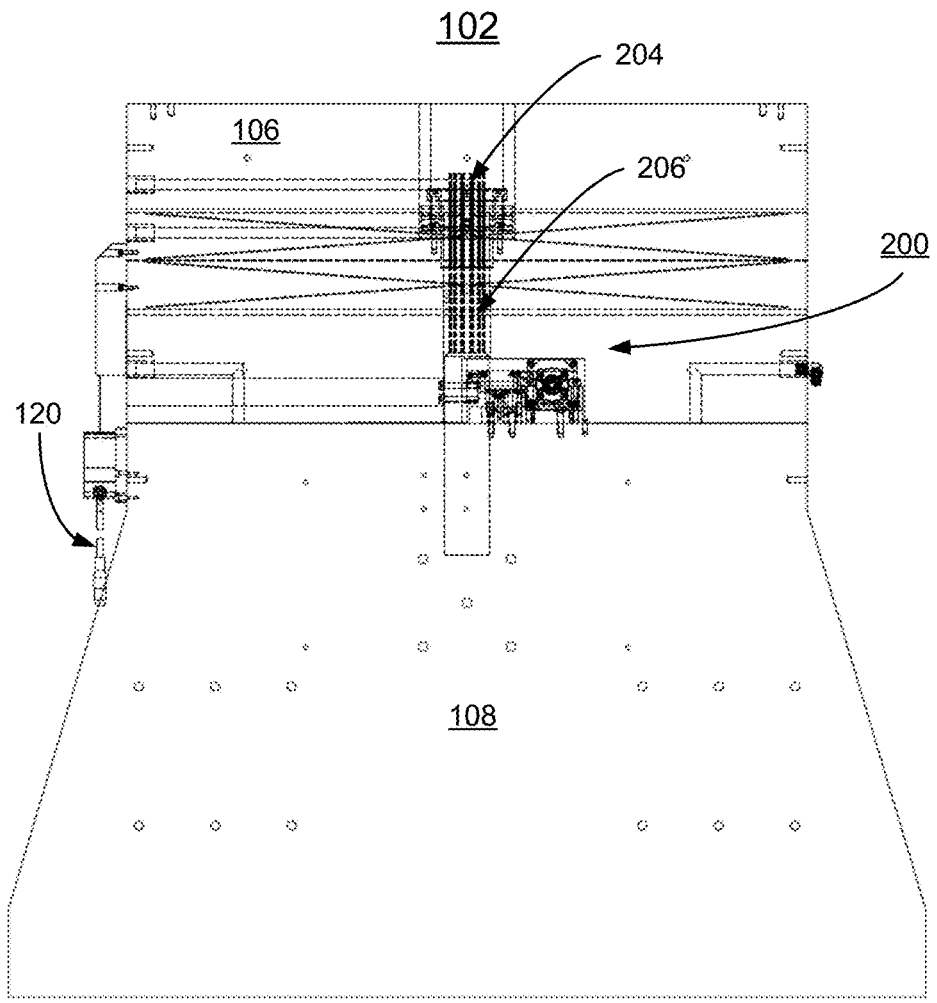
Figure 9:
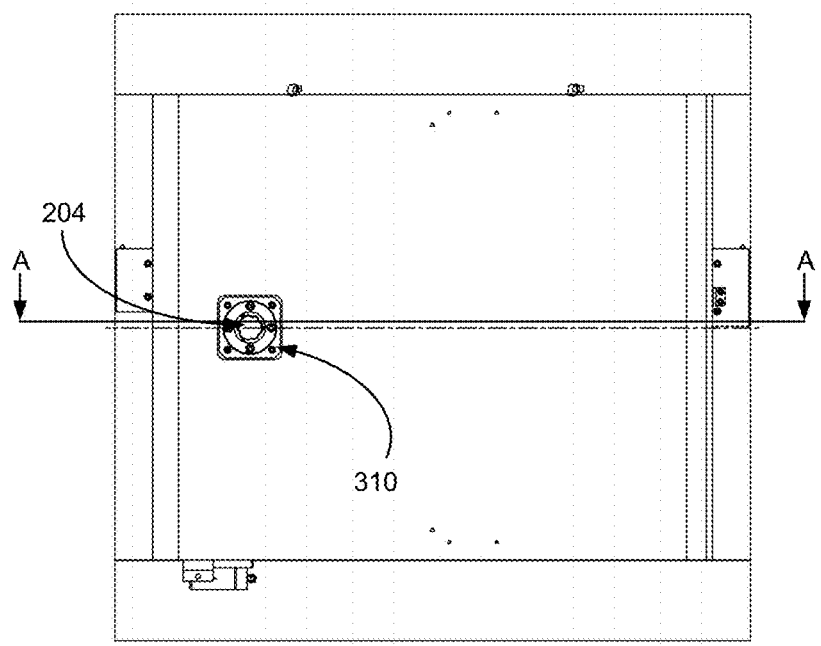
Figure 10:
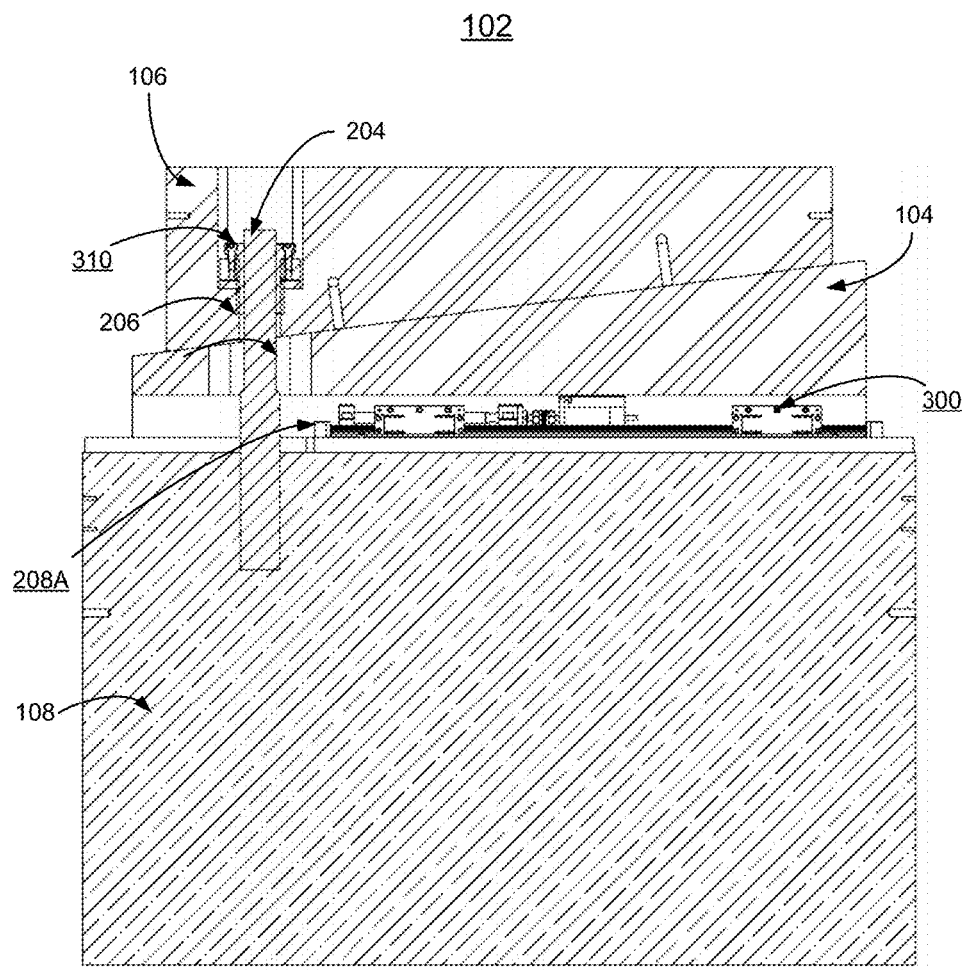

Referring also to FIGS. 2-10, in FIGS. 2, 3, and 4, there are shown respective front, side and top views of the apparatus 100. In FIGS. 5-10 the vertical stage 102 is illustrated without the X-axis stage 110. FIGS. 5 and 6 are side and front views and FIGS. 7 and 8 are side views illustrating drive and guiding assembly 200 and vertical position encoder 120, and pressurized air supply input 122 for the integrated air bearings 600 illustrated in FIG. 15. FIG. 9 is a top view and FIG. 10 provides a cross-sectional view along the line A-A of FIG. 9.

Referring also to FIG. 11, there are shown example X-axis drive and guiding assembly, Y-axis drive and guiding assembly, and Z-axis drive and guiding assembly generally designated by the reference character 200 of the apparatus 100 in accordance with preferred embodiments. The X-axis and Y-axis drive and guiding assembly 200 include respective linear guiding mechanisms 208A, 208B. The respective X-axis drive and guiding assembly and Y-axis drive and guiding assembly 200 includes an actuator or a motor (not shown) connected at 202, such as a stepper motor that converts digital pulses into mechanical shaft rotations, type PKP268MD14BA-L motor providing 0.9 deg/step, bipolar, 4-lead with 2.23 N*m, a drive 204, such as a THK MDK 1402-3 Ball Screw 204, having 2 mm pitch, 145 mm travel manufactured and sold by THK of Schaumburg, Ill., USA. The respective X-axis drive and guiding assembly and Y-axis drive and guiding assembly 200 includes a ball spline 206 for example, a THK SLF 40 ball spline, and a linear guide 208, such as a THK HSR 15A linear guide, each manufactured and sold by THK of Schaumburg, Ill., USA. The Y-axis drive and guiding assembly 200 provides a minimum full step, for example, 5 μm for the driving wedge 104, and 0.9 μm for the driven wedge. The X-axis drive and guiding assembly provides a minimum full step, for example, 5 μm. This can be made smaller or larger based on an actuator choice. The actuator could also include a piezo, allowing nanometer level steps. The respective X-axis drive and guiding assembly and Y-axis drive and guiding assembly 200 includes an encoder 210, 0.5 μm, or 0.1 μm, such as a Renishaw TONiC encoder 210 manufactured and sold by Renishaw having an office at Hoffman Estates, Ill., USA. The Y-axis drive and guiding assembly 200 is inherently stable based on friction with, for example, a 10° wedge, and a moving mass of approximately 600 kg or 1320 lb. The X-axis drive and guiding assembly 200 provides a moving mass of approximately 350 kg or 770 lb.

The Y-axis drive and guiding assembly 200 such as shown in FIG. 11, provides one axis of motion with five constraints, and constraint in rotation about X and Z is provided by granite surface-to-surface contact. Constraint on translation in X and Z is provided by the ball spline 206, and constraint on translation about Y also is provided by ball spline 206, with maximum 1135 N*m (834.9 ft*lb), equivalent to 365 lb force at far corner of wedge. Flexure 310 on the ball spline 206 prevents over constraint in rotations about X and Z. Y-axis guidance of the driving wedge 104 includes a single rail 208A to properly constrain the wedge. The flexures 300 provided with the rail 208A and linear guide 208B allow for movement with the air bearings 600 lifted.

Referring also to FIGS. 12A and 12B, in FIG. 12A, there is shown an example two-axis rotation flexure 310. In FIG. 11, the two-axis rotation flexure 310 is shown between ball spline 206 and driven wedge 106. In FIG. 12B, there is shown an example single-axis translation flexure 300 that are shown in FIG. 11 with the linear guides 208A, 208B.

Referring also to FIG. 13, the example Z-axis drive assembly 400 is shown in accordance with preferred embodiments. As shown in FIG. 11, the Z-axis drive assembly 400 includes motor connected at 403 (motor not shown in this view), such as the stepper motor type PKP268MD14BA-L motor and drive 402, such as a THK MDK 1402-3 Ball Screw 204, having 2 mm pitch, 400 mm travel, and includes an encoder, such as encoder 210, 0.5 μm, such as a Renishaw TONiC encoder 210, and provides a moving mass of approximately 100 kg or 220 lb. The Z-axis guiding includes X: integrated air bearing and Y: integrated air bearing. The Z-axis drive assembly 400 includes a rail 402 carrying a Z-axis decoupling flexure 500.

Figure 14:
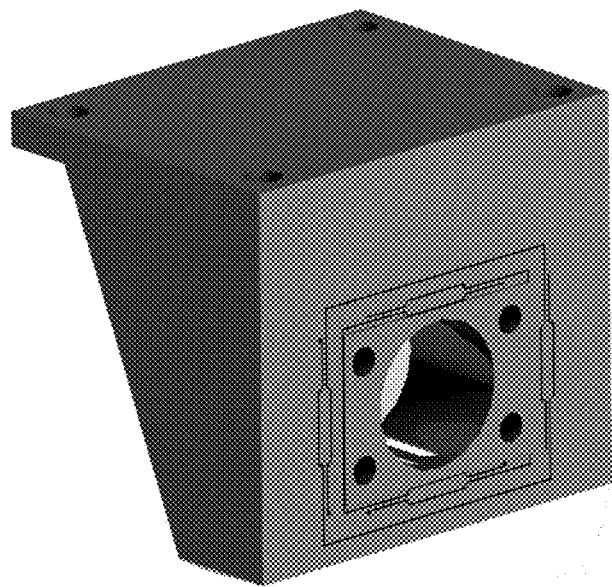
FIGS. 14 and 15 schematically illustrates not to scale a respective example Z-axis decoupling flexure for two translational axes allowing for motion with air bearing when lifted and an example Z-axis air bearing detail (with other axes similar) in accordance with preferred embodiments.
Figure 15:
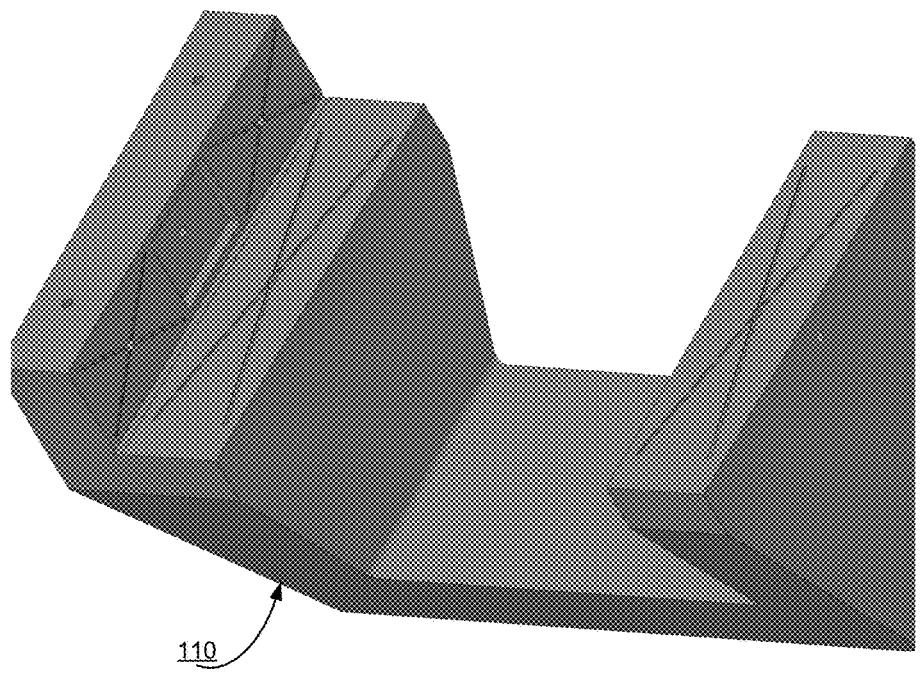

Referring also to FIGS. 14 and 15, in FIG. 14 there is shown an example Z-axis decoupling flexure 500 for two translational axes allowing for motion of air bearing when lifted. In FIG. 15 there is shown an example Z-axis air bearing 600 (with other axes similar) in accordance with preferred embodiments. The example Z-axis air bearing 600 is shown for the optic stage 110. The Z-axis drive assembly 400 provides, for example, a minimum full step of 5 μm.

Referring to FIGS. 16, 17, and 18, there are shown examples illustrating principle of operation for the Y axis including static operation, Z axis travel relative to wedge angle and Y travel range, and friction force and slope force as a function of wedge angle. When the ultra-high stability long-vertical travel stage 102 is designed in accordance with principles of the invention, stability is only dependent on geometry and material properties, not the motion control components.

In FIG. 16, there are shown example forces with two wedges generally designated by the reference character 700 of an example ultra-high stability long-vertical travel stage 102 in accordance with a preferred embodiment. To be stable, the friction force must exceed the weight force by a defined margin ($F_F \gg F_S$), the wedges must be properly constrained (not over constrained), the motion components must be properly decoupled, and the selected materials must have favorable thermal expansion properties. As shown in FIG. 16, the illustrated forces are defined as follows:

$F_W = mg$
$F_S = F_W * \cos \alpha = mg * \cos \alpha$
$F_N = F_W * \sin \alpha = mg * \sin \alpha$
$F_F = F_N * \mu$.

where μ is the friction coefficient.

In FIG. 17, there is shown an example wedge angle diagram generally designated by the reference character 800 with angle in degrees shown along the horizontal axis and Z direction travel in millimeters shown with respect to the vertical axis for example Y travel values for the example ultra-high stability long-vertical travel stage 102 in accordance with a preferred embodiment. Example Y travel values are illustrated with respective solid, and dashed lines include 5 mm, 10 mm, 15 mm, 20 mm and 25 mm.

In FIG. 18, there is shown an example force estimation diagram generally designated by the reference character 900 with angle in degrees shown along the horizontal axis and force in N shown with respect to the vertical axis for example friction force and slope force for the example ultra-high stability long-vertical travel stage 102 in accordance with a preferred embodiment. Friction force and slope force are illustrated as a function of wedge angle, with a friction coefficient μ of 0.36.

In brief summary, the ultra-high stability long-vertical travel stage 102 is particularly suited to a wide variety of applications, including X-ray microscopes, synchrotron beamline optic component supports, synchrotron beamline precision instrument supports, accelerator magnet supports, accelerator beam position monitor supports, and semiconductor fabrication machines. The ultra-high stability long-vertical travel stage 102 can provide an arbitrary travel range, with dynamic and thermal stability typically associated with a rigid structure. The ultra-high stability long-vertical travel stage 102 is much stiffer than state-of-the-art guiding mechanisms having significant compliance, such as rolling element bearings or flexures. The ultra-high stability long-vertical travel stage 102 has better thermal drift performance than such state-of-the-art guiding mechanisms. The ultra-high stability long-vertical travel stage 102 remains highly stable with large travel range, providing large load capacity.

While the present invention has been described with reference to the details of the embodiments of the invention shown in the drawing, these details are not intended to limit the scope of the invention as claimed in the appended claims.

What is claimed is:

1. An apparatus for implementing an ultra-high stability long-vertical travel stage comprising:
   a first wedge supporting a second wedge, each wedge formed of a selected stable material having predefined rigidity and low thermal expansion coefficient, and said first wedge and said second wedge have surfaces with predefined flatness;
   integrated air bearings; said integrated air bearings designed for wedge-to-wedge contact when the travel stage is not in motion;
   a drive and guiding assembly coupled to said first wedge;
   said drive and guiding assembly including a linear guiding mechanism with a plurality of flexures; and
   said drive driving said first wedge in a horizontal plane for providing vertical motion on the second wedge with the integrated air bearing lifted and said plurality of flexures allowing for movement in a travel range of between approximately 10 millimeters and 100 millimeters with ultra-high stability at a nano-meter (nm) level and with enhanced thermal stability and enhanced load capacity.

2. The apparatus as recited in claim 1 wherein said drive and guiding assembly includes an actuator.

3. The apparatus as recited in claim 2 wherein said actuator includes a motor and wherein said drive and guiding assembly includes a mechanism to couple said motor actuator to a carriage.

4. The apparatus as recited in claim 1 wherein said linear guiding mechanism includes a linear guide and a constraint mechanism of said second wedge.

5. The apparatus as recited in claim 4 includes a flexure provided between said linear guide and said driving first wedge.

6. An apparatus for implementing an ultra-high stability long-vertical travel stage comprising:
   a first wedge supporting a second wedge, each wedge formed of a selected stable material having predefined rigidity and low thermal expansion coefficient;
   integrated air bearings;
   a drive and guiding assembly coupled to said first wedge;
   said drive and guiding assembly including a linear guiding mechanism with a plurality of flexures; said linear guiding mechanism including a linear guide and a constraint mechanism of said second wedge;
   a two-axis rotation flexure between said constraint mechanism and said driven second wedge; and
   said drive driving said first wedge in a horizontal plane for providing vertical motion on the second wedge with the integrated air bearing lifted and said plurality of flexures allowing for movement.

7. The apparatus as recited in claim 6 wherein said plurality of flexures include a single-axis translation flexure between a linear guide and said first wedge.

8. The apparatus as recited in claim 6 wherein said constraint mechanism includes a ball spline connected directly to a linear guide block.

9. An apparatus for implementing an ultra-high stability long-vertical travel stage comprising:
   a first wedge supporting a second wedge, each wedge formed of a selected stable material having predefined rigidity and low thermal expansion coefficient integrated air bearings;
   a drive and guiding assembly coupled to said first wedge;
   said drive and guiding assembly including a linear guiding mechanism with a plurality of flexures;
   said drive driving said first wedge in a horizontal plane for providing vertical motion on said second wedge with the integrated air bearing lifted and said plurality of flexures allowing for movement; and
   said first wedge supporting said second wedge includes a predefined wedge angle providing said first wedge and said second wedge fixed in place due to the friction.

10. The apparatus as recited in claim 9 wherein a travel range is selectively scaled in a range between about 10 millimeters and 100 millimeters.

11. The apparatus as recited in claim 9 wherein said ultra-high stability long-vertical travel stage provides an arbitrary travel range with dynamic and thermal stability.

12. The apparatus as recited in claim 9 wherein said first wedge and said second wedge have surfaces with predefined flatness.

13. The apparatus as recited in claim 9 wherein drive assembly includes an encoder for precision motion systems.

* * * * *